US008109815B2

(12) United States Patent
Hollatz (10) Patent No.: US 8,109,815 B2
(45) Date of Patent: *Feb. 7, 2012

(54) COMBINE HAVING A CUTTING MECHANISM AND A FEED MECHANISM (75) Inventor: Brian Hollatz, Porto Alegra (BR)

(73) Assignee: AGCO Do Brasil Comercio e Industria Ltda, Canoas (BR)

( * ) Notice: Subject to any disclaimer, the term of this patent is extended or adjusted under 35 U.S.C. 154(b) by 0 days.

This patent is subject to a terminal disclaimer.

(21) Appl. No.: 12/602,737

(22) PCT Filed: May 27, 2008

(86) PCT No.: PCT/IB2008/002194
§ 371 (c)(1),
(2), (4) Date: Dec. 2, 2009

(87) PCT Pub. No.: WO2008/149239
PCT Pub. Date: Dec. 11, 2008

(65) Prior Publication Data
US 2010/0173684 A1  Jul. 8, 2010

(30) Foreign Application Priority Data
Jun. 8, 2007  (GB) .................................. 0710995.2

(51) Int. Cl.
A01F 12/10 (2006.01)
(52) U.S. Cl. ................. 460/70; 460/16; 460/66; 460/80
(58) Field of Classification Search .................... 460/70, 460/46, 16, 17, 20, 45, 59, 65–67, 79, 80, 460/81, 84, 119
See application file for complete search history.

(56) References Cited

U.S. PATENT DOCUMENTS

| 4,291,709 A | * | 9/1981 | Weber et al. ..................... 460/70 |
| 4,665,929 A | * | 5/1987 | Helm .............................. 460/67 |
| 5,334,093 A |   | 8/1994 | Jensen et al. |

(Continued)

OTHER PUBLICATIONS

UK Search Report for Application No. GB0710995.2 dated Sep. 24, 2007.

(Continued)

Primary Examiner — Thomas Will
Assistant Examiner — Mai Nguyen (57) ABSTRACT

A combine has a cutting mechanism (12) for cutting a crop and a feed mechanism (13) for feeding the cut crop towards a threshing and/or separating rotor (21) which rotates within a housing (20) about an axis disposed generally longitudinally relative to the combine, the cut crop moving between the rotor and the housing from an inlet end of the housing towards an outlet end of the housing across a grating (22) through which separated grain leaves the housing. The harvested crop is fed by a final feed section (18) of the feed mechanism into the inlet end (20a) of the housing across a transition edge (A-A, B-B, C-C) of the housing which is split into a number of sections. The overall direction of extension of each section (A-A, B-B, C-C) of the transition edge is inclined at substantially the same angle with respect to the axis of rotation of the rotor so that the crop entering the inlet end of the housing across the transition edge does so generally perpendicular to the transition edge, the transition edge being inclined generally helically relative to the axis of rotation of the rotor.

11 Claims, 8 Drawing Sheets

U.S. PATENT DOCUMENTS

| | | | | |
|---|---|---|---|---|
| 5,344,367 | A | * | 9/1994 | Gerber .......................... 460/68 |
| 5,454,758 | A | * | 10/1995 | Tophinke et al. ............... 460/68 |
| 6,517,431 | B2 | * | 2/2003 | Schwersmann ................. 460/16 |
| 2002/0045469 | A1 | * | 4/2002 | Schwersmann ................. 460/70 |

OTHER PUBLICATIONS

PCT Search Report for International Application No. PCT/IB2008/002194 dated Mar. 26, 2009.

* cited by examiner

COMBINE HAVING A CUTTING MECHANISM AND A FEED MECHANISM

This invention relates to combine harvesters and in particular to arrangements for feeding harvested crop into the inlet end of a so-called axial threshing and/or separating mechanism.

Such mechanisms conventionally comprise a rotor which rotates within a housing about an axis disposed generally longitudinally relative to the combine, the harvested crop moving between the rotor and the housing from an inlet end of the housing towards an outlet end of the housing across a grating through which separated grain leaves the housing, There is a requirement to provide a combine in which the flow of crop between the housing and the rotor is maximised and the power consumption of the threshing and/or separating mechanism is reduced to a minimum.

Thus according to the present invention there is provided a combine having a cutting mechanism for cutting a crop and a feed mechanism for feeding the cut crop towards a threshing and/or separating rotor which rotates within a housing about an axis disposed generally longitudinally relative to the combine, the cut crop moving between the rotor and the housing from an inlet end of the housing towards an outlet end of the housing across a grating through which separated grain leaves the housing, the combine being characterised in that the harvested crop is fed by a final feed section of the feed mechanism into the inlet end of the housing across a transition edge of the housing which is split into a number of sections, the overall direction of extension of each section of the transition edge being inclined at substantially the same angle with respect to the axis of rotation of the rotor so that the crop entering the inlet end of the housing across the transition edge does so generally perpendicular to the transition edge, the transition edge being inclined generally helically relative to the axis of rotation of the rotor.

By introducing the crop into the inlet of the housing at right angles to helical edges the effective width of the crop flow is maximised and the corresponding effects of friction and damage to the crop is minimised.

Preferably the final feed section of the feed mechanism is divided into a number of ramp sections each feeding a respective transition edge section to direct the crop generally perpendicular to the respective edge section.

The transition edge sections are preferably joined by interconnecting sections which extend generally perpendicular to the transition edge sections. These interconnecting sections can also be considered to lie on a helix.

The transition edge sections plus the interconnecting sections between them preferably extend around approximately 180° of the inlet end of the housing.

The transition edge sections are also preferably offset in both a rotational and an axial sense around the circumference of the inlet end of the housing in the direction of rotation of the rotor. The first edge is farthest back axially along the axis of the rotor.

Preferably there are three transition edge sections.

Prior to entering the final feed section of the feed mechanism the crop preferably passes around a crop beater which rotates about an axis generally transverse to the combine.

The beater is preferably divided asymmetrically along its length into a number of sections corresponding to the number of ramp sections in the final feed section, each section of the beater having differently angled crop feeding members which direct crop towards a ramp section.

Prior to entering the final feed section of the feed mechanism the crop preferably passes between a threshing cylinder and separating concave which are disposed generally transverse to the combine.

The crop passes around the concave prior to passing around the beater.

One embodiment of the present invention will now be described, by way of example only, with reference to the accompanying drawings in which:—

Figure 1:
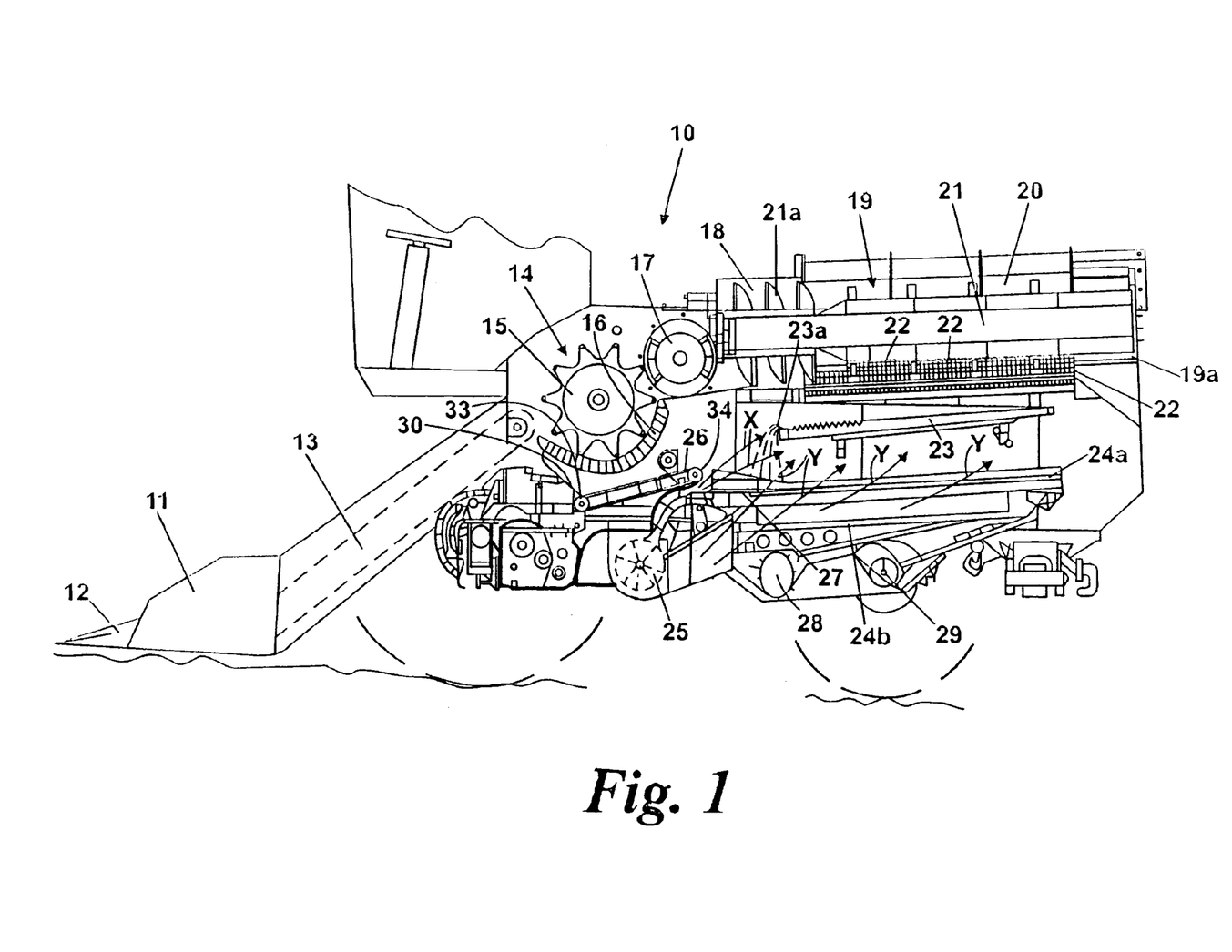
FIG. 1 is a vertical section through a combine harvester in accordance with the present invention.
Figure 2:
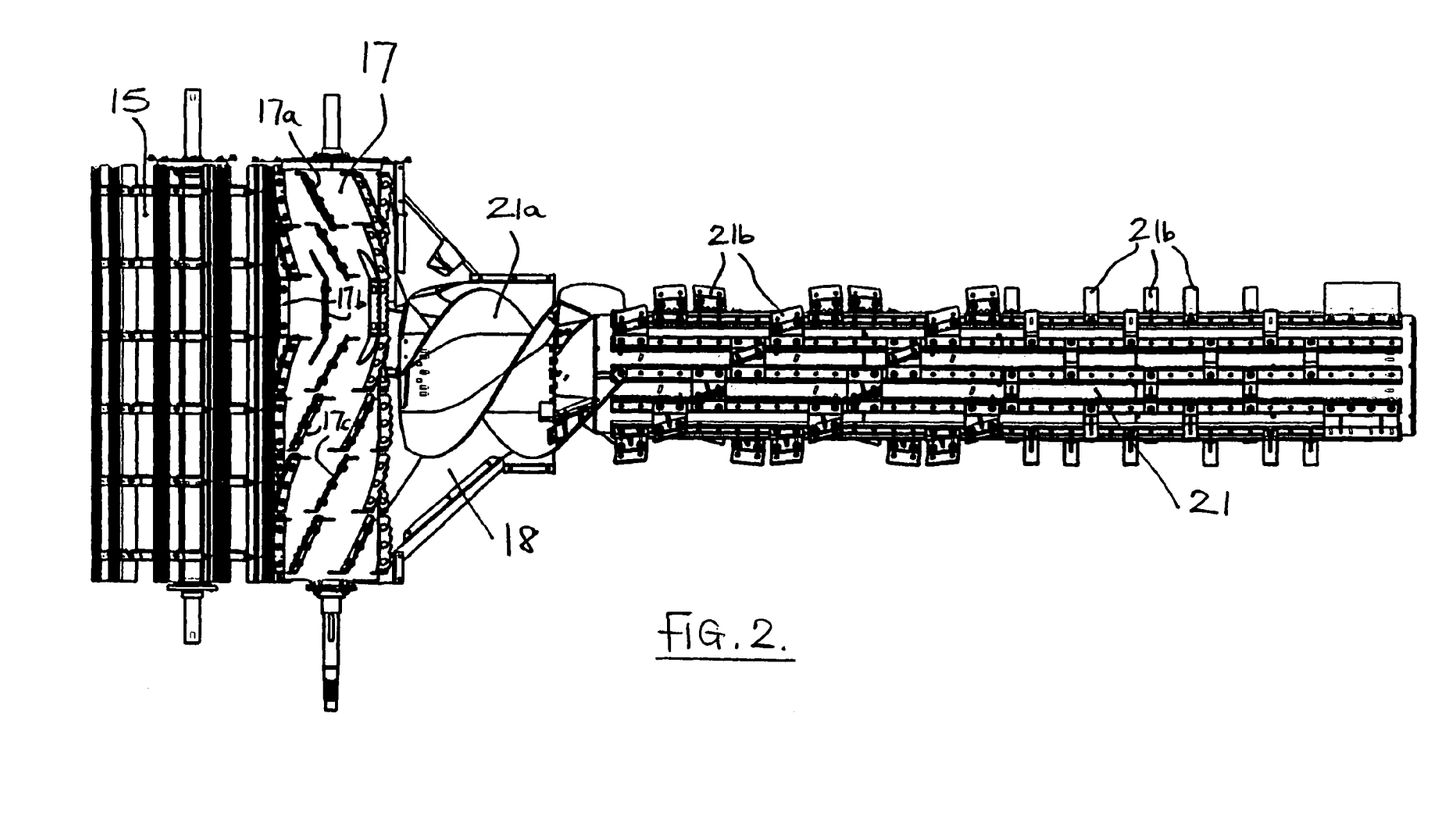
FIG. 2 shows a plan view of the threshing and separating mechanism of the combine of FIG. 1.
Figure 3:
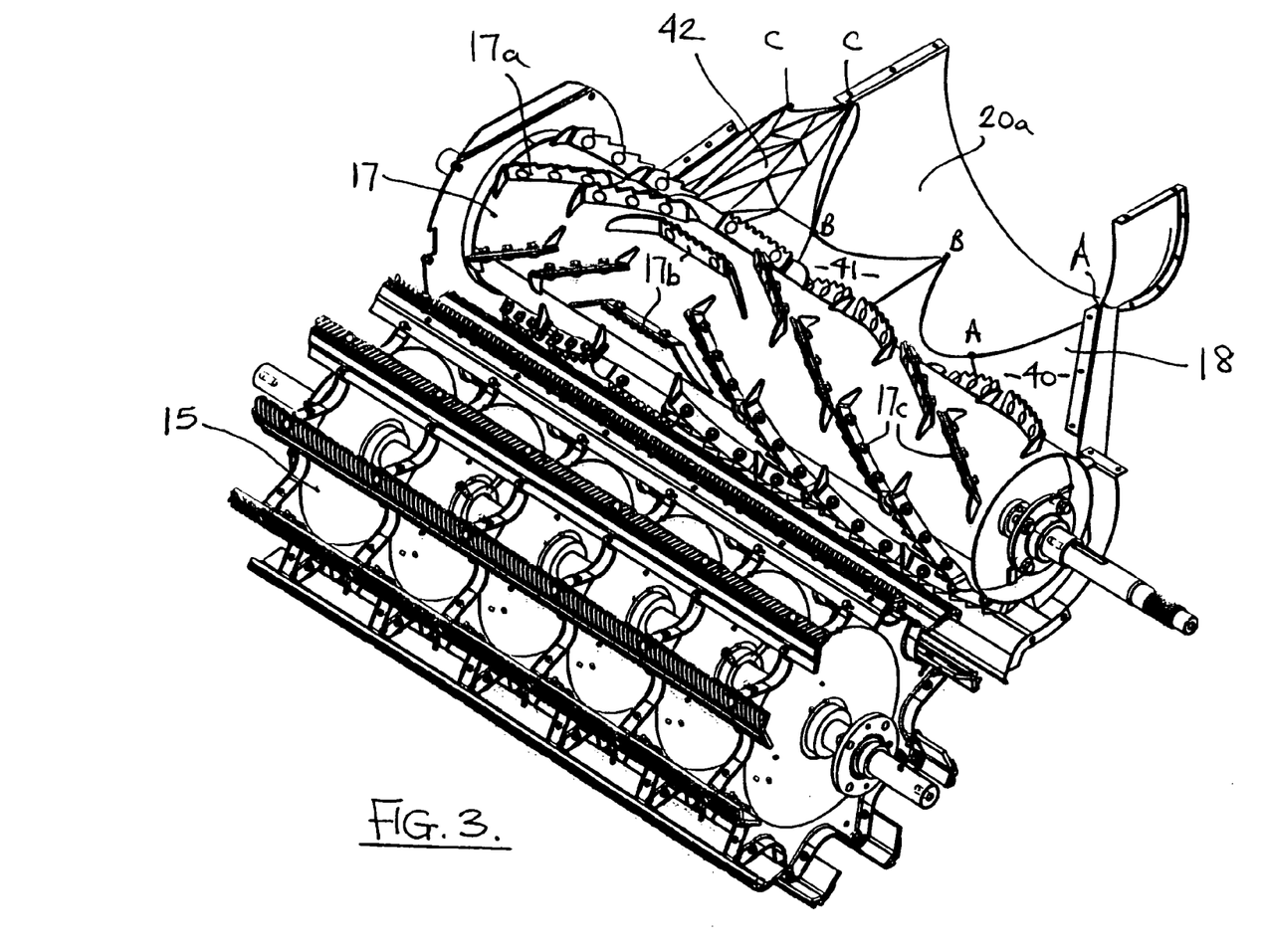
FIG. 3 shows a perspective view in more detail of the front part of the threshing and separating mechanism of FIG. 2.
Figure 4:
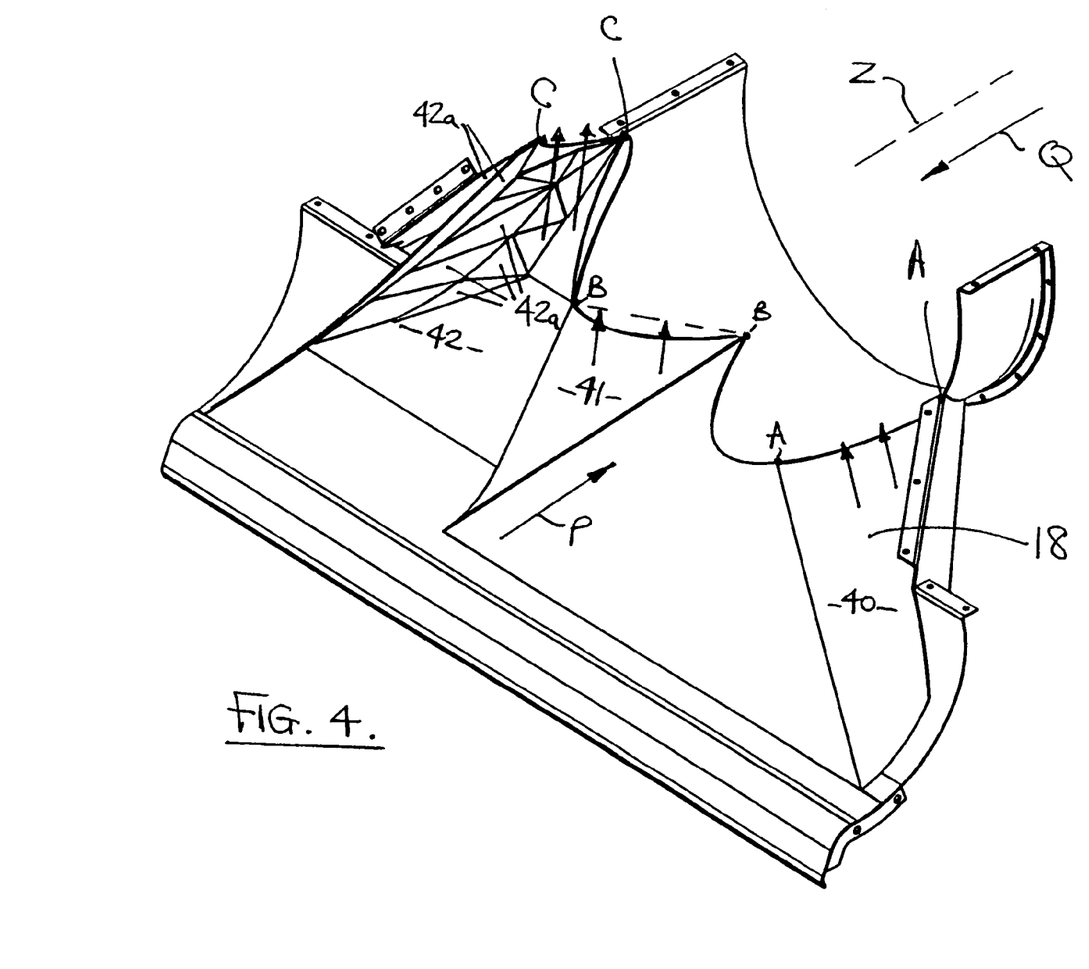
FIG. 4 shows a perspective view of the crop feed geometry of the present invention with the beater and threshing cylinder etc removed for clarity.

Referring to the drawings, a combine harvester 10 has a table shown diagrammatically at 11 which includes a cutter mechanism 12 and a feed mechanism which includes an elevator 13 which feeds harvested crop to a thrashing mechanism 14 in the form of a threshing cylinder 15 and a concave 16. Crop exiting from the concave 16 is fed to a beater 17 which feeds the crop towards its centre and hence via a final feed section 18 into an axial separator 19.

The separator 19 comprises a cylindrical housing 20 within which a separating rotor 21 rotates. The rotor 21 has helical flights 21a rotating in the final feed section 18 which move the crop through section 18. The crop is then moved axially through the separator in the annular gap between the housing 20 and the rotor 21. The lower portion 22 of separator 19 is a series of gratings through which grain, chaff and smaller straw portions etc. fall onto a reciprocating grain pan 23 which transports this material forward until the material cascades from the front end of the pan 23 as shown at 23a into a cleaning mechanism which includes a reciprocating upper sieve 24a, a reciprocating lower finer sieve 24b and an associated transverse fan 25. The larger more bulky straw etc. exits from the rear 19a of the separator.

The grain, chaff and straw which passes through the concave 16 is transported towards the sieves 24a and 24b by a belt conveyor 26 which is the subject of the Applicant's co-pending PCT Application No. PCT/IB2006/003906. The conveyor 26 discharges onto a reciprocating grain pan 27 which in turn discharges onto upper sieve 24a with air flows X and Y from fan 25 being used to remove chaff and other material lighter than the grain in the conventional manner.

If desired the grain pan 27 can be eliminated completely or can be replaced by a further short belt conveyor.

The grain which passes through the finer lower sieve 24b is collected in the region 28 of the combine for movement into a grain tank on the combine and the tailings (a mixture of partly cleaned/separated grain, chaff and straw) which passes through the upper sieve 24a, but not the lower finer sieve 24b, is collected in the region 29 of the combine from where it is reintroduced into the machine to be reprocessed.

A deflector plate 30 ensures that all the material falling through the concave 15 falls onto the conveyor 26. The conveyor comprises an endless belt 32 which may have raised ridges to aid transport of the material and is supported on two end rollers 33 and 34 which are carried on the combine body.

The present invention is concerned with the design of the final feed section 18 which feeds the harvested crop into the inlet end 20a of the housing 20.

As best seen from FIGS. 3 to 7 the final feed section 18 is shaped to feed the harvested crop which emerges from the beater 17 in three crop streams into the inlet end 20a of the housing 20 across three transition edges of the inlet end of the housing which are shown at A-A, B-B and C-C in the above drawings. Crop is fed across these edges generally at right-angles in order to minimize the effect on the crop as it enters the inlet end of the housing. Each edge A-A, B-B and C-C is provided with its own ramp section 40, 41 and 42 respectively which directs crop towards the edge generally at right-angles thereto. The edges A-A, B-B and C-C can in fact be regarded as being on separate sections of the helical path drawn around the inside of the housing 20.

Although these edges A-A, B-B and C-C are in practice curved due to the intersection of the ramps 40, 41 and 42 on the cylindrical inlet end of the housing 20, the general direction of extension of each edge (i.e a straight line drawn between the ends A-A, B-B and C-C) all extend generally at the same angle β (see FIG. 7) relative to a perpendicular to the axis of rotation Z of the rotor 21. The interconnecting edges A-B and B-C and the outer edges of outer ramps 40 and 42 extend generally perpendicular to the edges A-A, B-B and C-C so that crop flowing towards edges A-A, B-B and C-C moves generally parallel to these edges A-B, B-C etc and the frictional drag on the crop is minimised. These interconnecting edges A-B and B-C also lie on a helix generally perpendicular to the helix on which edges A-A, B-B and C-C lie.

The velocity of the crop as it passes through rotor is important in determining the capacity of the rotor and in preserving a good flow of material through the combine. Ideally the material should be gently accelerate as it passes through the combine from threshing cylinder 15 to beater 17 and into rotor 21 in order to avoid any tendency for the material to back-up and jamb the combine of for the material to be accelerated too violently which may damage the straw and consume more power and inhibit grain separation.

Thus in order to design the location and shape of feed edges A-A, B-B and C-C of the rotor housing the flow of material through the entire combine needs to be taken into account.

For example, with a threshing cylinder 15 of a diameter of say 750 mm rotating at say 700 r.p.m. this gives a threshing cylinder peripheral speed of 27.5 m/s. As the crop material travelling around the threshing cylinder tends to travel at approximately 50 percent of this speed this gives a crop speed of say 13.75 m/s on exit from the threshing cylinder.

With a beater of say 465 mm diameter operating at a speed ratio of 1.17:1 compared to the speed of the threshing cylinder the peripheral speed of the beater will be (700×1.17×465× 3.142/60)=19.9 m/s. If we assume that slippage between the beater and the crop is not less than 20 percent, this means that the crop will leave the beater at a speed of 15.9 m/s.

To assist in moving the crop through the annular gap between the rotor 21 and housing 20 the housing is provided with helical guide vanes and the rotor 21 with helical flights 21a in final feed section 18 and paddles 21b inside the housing 20. The movement of the crop through the housing 20 can be viewed as a wide helical ribbon of crop which wraps around the rotor 21 with the width of this ribbon being determined by the pitch of the guide vanes on housing 20.

Experience shows that a guide vane pitch of 30 degrees from the rotor axis is reasonable. Thus with a housing 20 having an inlet diameter of say 712 mm the maximum width of ribbon of crop which can be wrapped around the housing 20 in a 30 degree helix without overlapping is 712×3.142×Sin 30=1120 mm.

Experience also dictates that in most European field conditions the coefficient of friction between the crop and the housing 20 is typically 0.4 to 0.45 although it can rise in difficult (humid) conditions to up to say 0.6.

We need to choose a flight pitch in final feed section 18 which establishes crop flow in approximately the correct direction and at the correct speed for good flow and early separation. Flight pitch affects both the capacity of the rotor and the speed of crop as it passes through the rotor.

Figure 9:
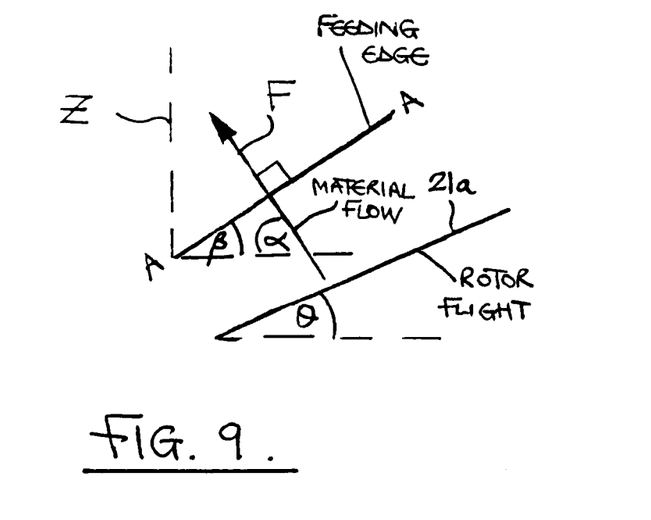
FIG. 9 shows diagrammatically the relationship between the material flow, rotor flight and feed edge angles of a rotor embodying the present invention.

Rotor capacity is a function of the axial velocity at which the flighting can move crop through the annular gap between the rotor and the housing. We have developed the following equations which are unitless "velocity factors" (VFs) (having values between zero and one) which are multiplied by the peripheral speed of the rotor to give the actual velocity values:—

$$VFaxial = (\cos\theta - f\sin\theta)\sin\theta \quad \text{equation (a)}$$

$$VF\,pheriheral = (\sin\theta + f\cos\theta)\sin\theta \quad \text{equation (b)}$$

$$VF\,total = \sin\theta(1+f^2)^{0.5} \quad \text{equation (c)}$$

where θ is the rotor flight pitch angle (see FIG. 9) measured from a perpendicular to the rotor axis of rotation and f is the coefficient of friction between the crop and the housing 20.

Thus taking equation (a) and plotting the variation of axial velocity factor (VFaxial) with friction coefficient for a range of flight pitch angle of say 20 to 45 degrees it can be shown that for our target friction coefficient range of 0.4 to 0.6 the highest axial velocity factor (and thus highest rotor capacity) is achieved using a flight pitch in the range 30 to 35 degrees.

From our consideration above we are aiming to have a crop velocity of 15.9 m/s or more as the crop enters the rotor.

Taking equation (c) above and assuming that the rotor has a flight pitch (θ) of 30 degrees and a coefficient of friction of 0.45 gives a total velocity factor (VFtotal) of 0.548. With a rotor of 700 mm diameter rotating at 800 r.p.m this gives a velocity of 800×700×7π/60×0.548=16.06 m/s. This is slightly above the required value of 15.9 m/s but acceptable.

It has been established that there is a mathematical relationship between the pitch angle of θ of the flights 21a or rotor 21 and the direction of flow of harvested material (angle α) in the rotor (see FIG. 9).

The relationship is:—

$$\tan\alpha = (\cos\theta - f\sin\theta)/(\sin\theta + f\cos\theta)$$

With a coefficient of friction of 0.45 and a flight pitch angle θ of 30 degrees this give a crop flow angle α of 35.8 degrees from a perpendicular to the axis of rotation of the rotor. Since the edges A-A, B-B and C-C are at right angles to the direction of crop flow this means that the edges are inclined at an angle β of 54.2 degrees (approximately 55 degrees) to the perpendicular to the axis of rotation of the rotor.

Thus we have to feed the crop into the housing 20 across one or more edges inclined at approximately 55° to the rotor perpendicular with a crop ribbon of a width of approximately 1120 mm (say 1050 mm) as determined above.

Figure 7:
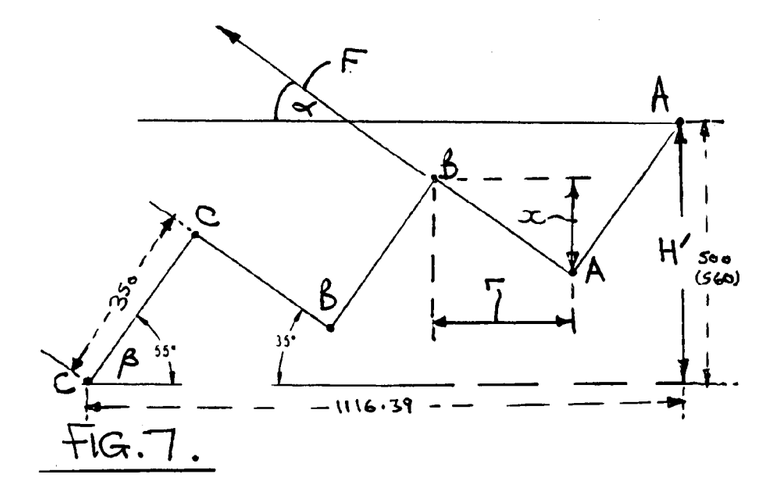
FIG. 7 shows diagrammatically the crop feed geometry of FIG. 4 laid out flat for clarity.
Figure 10:
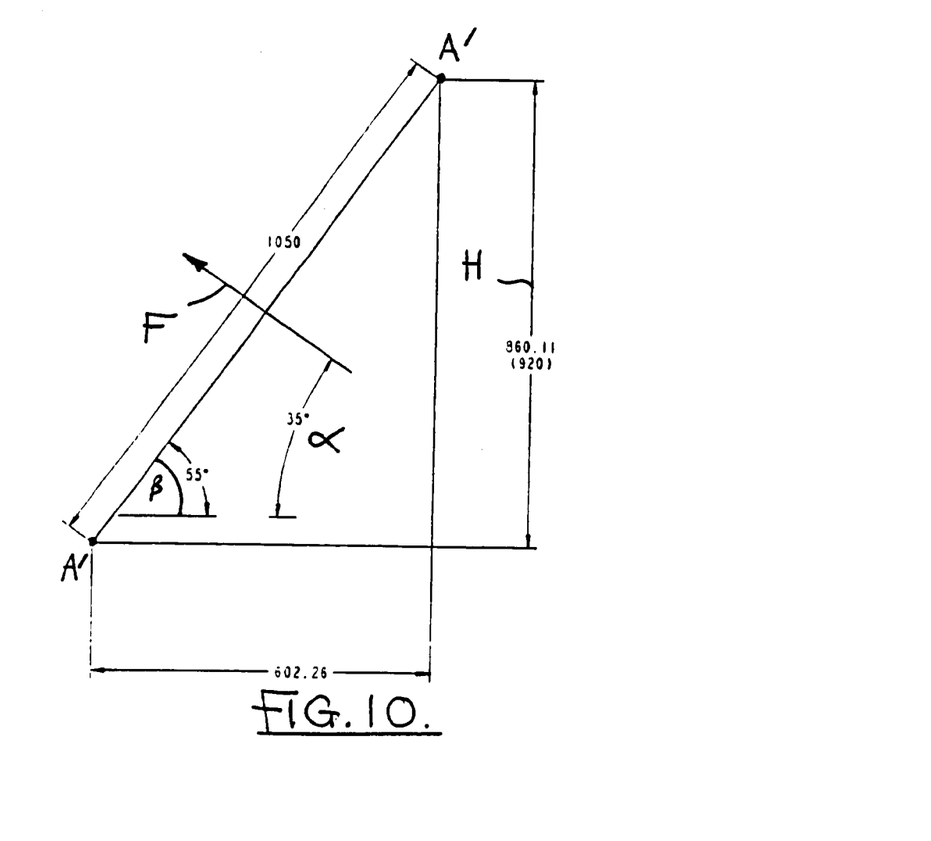
FIG. 10 shows a theoretical single edge over which crop could be fed into the rotor.

If this crop was to be fed across a single edge $A^1$-$A^1$ (as shown in FIG. 10) this would cause problems since much of the edge $A^1$-$A^1$ is a considerable distance H from the inlet end 20a of the housing 20 and significant power losses would be incurred in attempting to throw the crop across this large distance H. This problem is overcome by splitting the edge $A^1$-$A^1$ into the three edges A-A, B-B and C-C referred to above each of a length of say 350 mm to give a total crop ribbon width of say 1050 mm. FIG. 7 shows diagrammatically the shape of the final feed section 18 which contains the edges A-A, B-B and C-C rolled out flat with the direction of feeding of the crop indicated generally by the arrow F.

The objective is to provide the smoothest transition of the feeding of crop from the beater 17 to the rotor 21 this will be achieved if crop leaves the beater 17 tangentially and also enters the annular gap between the rotor 21 and the housing 20 tangentially relative to the rotor. This will minimise changes in the direction of flow of the crop and reduce damage to the straw and reduce the power required to drive the beater and rotor.

Figure 5:
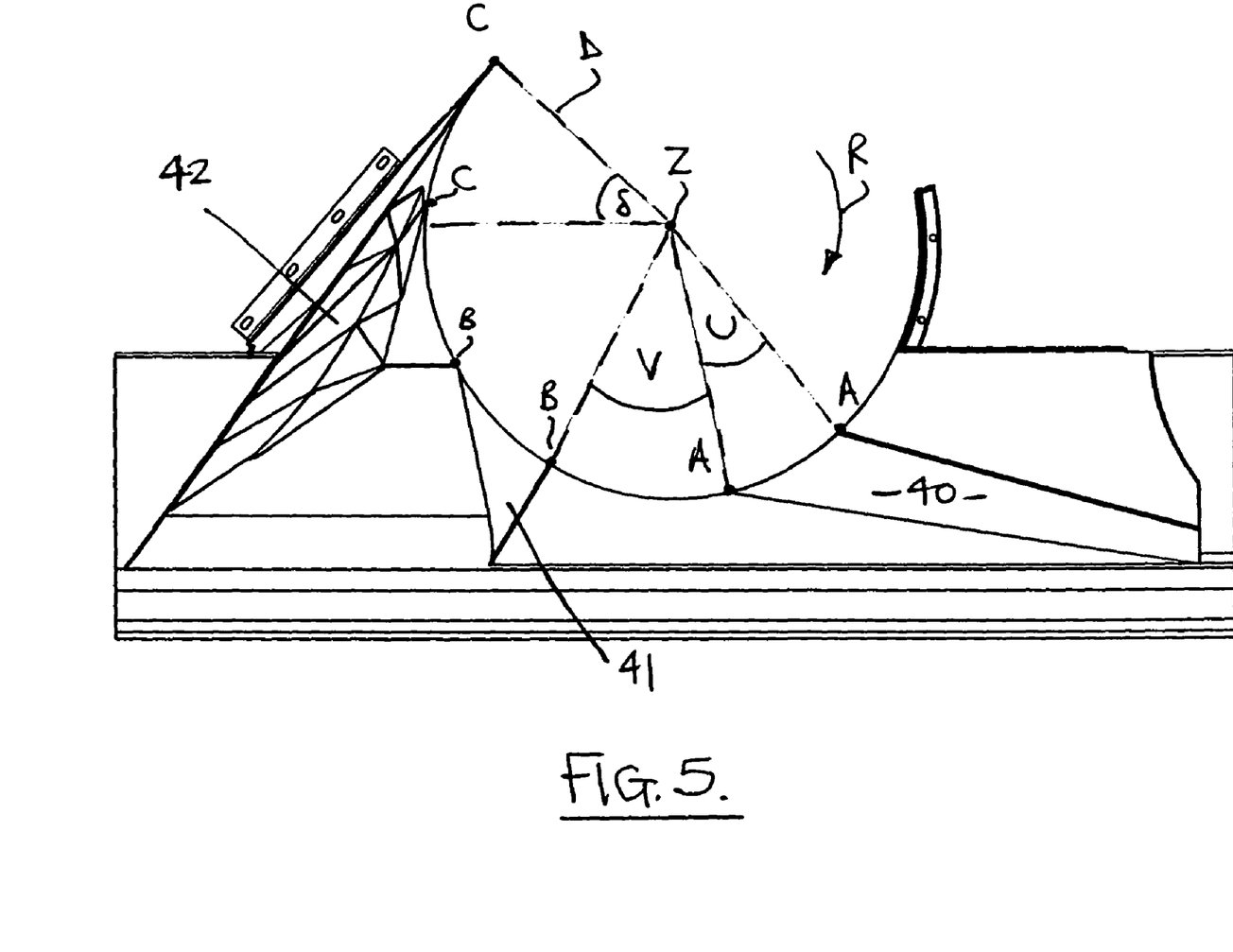
FIGS. 5 and 6 show the crop feed geometry of FIG. 4 viewed in the direction of arrows P and Q respectively.
Figure 6:
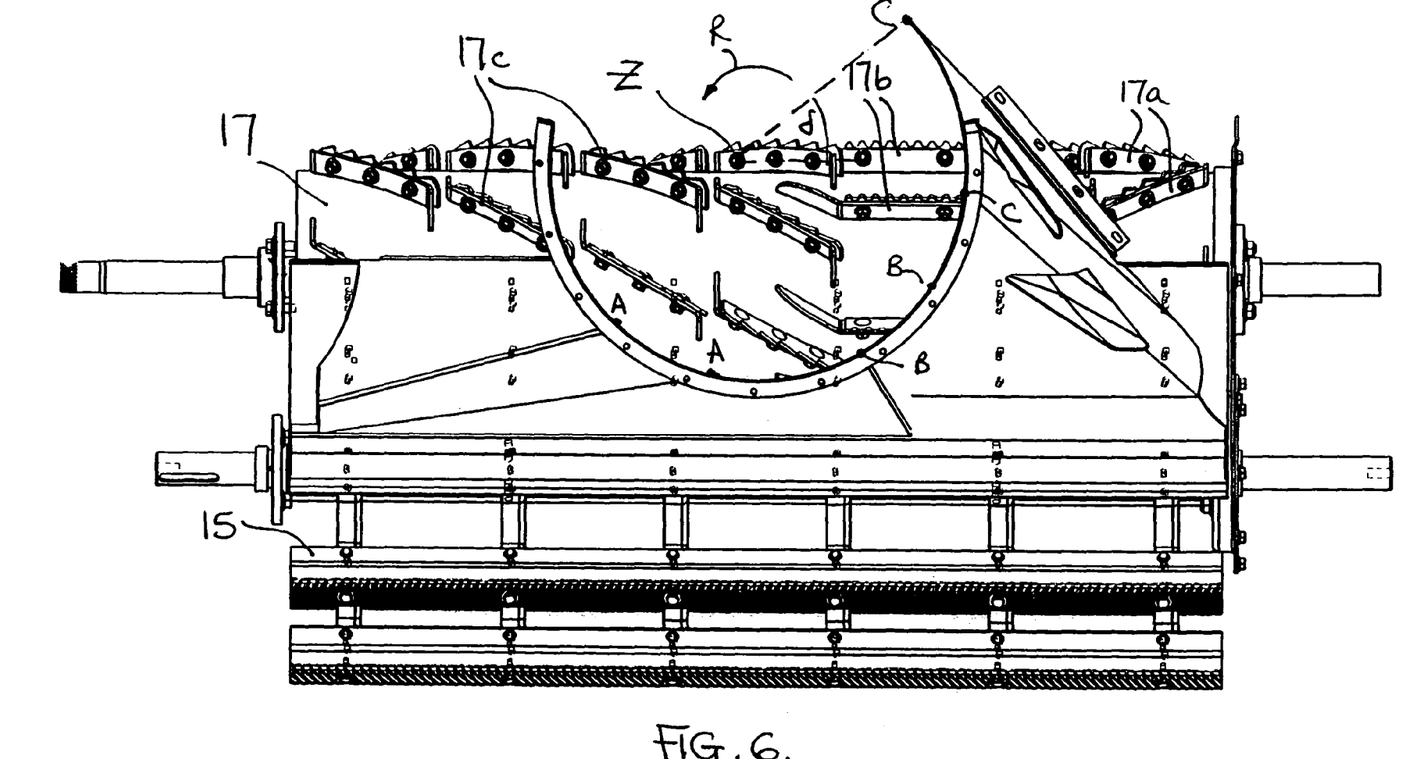

This attempt to achieve a tangential flow of crop from the beater to the rotor leads to the position of the feed edges A-A, B-B and C-C being rotated circumferentially around the periphery of the inlet of the housing in the general direction of rotation R of the rotor by an angle of δ of approximately 30 degrees from the horizontal (see FIG. 5). Typically the angle U encompassed by each edge A-A, B-B and C-C is 30 degrees and the angle V encompassed by the interconnecting edges A-B and B-C is 41 degrees.

As can be seen from FIGS. 3 to 6, these edges A-A, B-B and C-C and the interconnecting edges A-B and B-C extend circumferentially approximately 180 degrees around the periphery of the housing with the edges offset in a rotational sense (see dimension "r" in FIG. 7) around the periphery of the inlet of the housing in the general direction of rotation R of the rotor. These edges can be though of sections of the same helix offset both axially and rotationally with the first edge A-A off-set furthest axially. This rotational off-set (angle δ) shown in FIGS. 5 and 6 by a radius D drawn through the end of edge C-C further ensures a smooth flow of crop material into the inlet end of the housing with minimum drag etc. It will also be seen from FIG. 7 that the edges A-A, B-B and C-C are off set (see dimension "x") in an axial sense with first edge A-A being further from the inlet end of the housing so that the distance $H^1$ of the furthest part of edge A-A from the inlet end of the housing is significantly reduced compared with the distance H of FIG. 10 thus reducing the power required to feed the crop into the housing.

Figure 8:
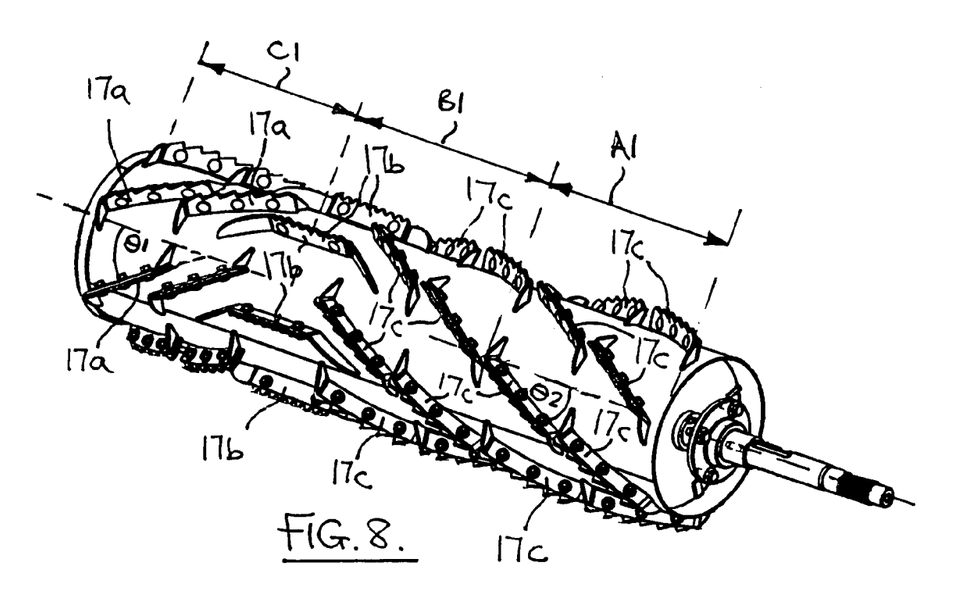
FIG. 8 shows a perspective view of the beater used in the combine of FIG. 1 in more detail.

The beater 17 which feeds the crop into the final feed section 18 is provided with a series of crop feeding members 17a, 17b and 17c which may be toothed or without teeth and which are inclined at different angles to the axis of rotation of the beater. This asymmetrical arrangement of the feeding members along the length of the beater 17 is designed to feed the crop material in three streams up ramps 40, 41 and 42 to the transition edges A-A, B-B and C-C respectively. The asymmetrical arrangement of the feed members 17a, 17b, and 17c is necessary due to the rotation of the feed edges A-A, B-B and C-C through the angle δ. Thus the crop material which passes around a first third A1 of the beater is directed using some of the feeding members 17c up ramp 40 towards and across the edge A-A. The central third B1 of the beater directs crop up ramp 41 to the edge B-B using some of the feeding members 17c and some of the feeding members 17b. Finally the third portion C1 of the beater directs crop up ramp 42 to the edge C-C using the feeding members 17a and some of the feeding members 17b. Typically the feeding members of 17a are inclined at an angle θ1 of 30 degrees relative to the axis of rotation of the beater whilst the feeding members 17b are generally parallel to the axis of rotation of the beater and the feeding members 17c are inclined at an angle θ2 of 30 degrees relative to the axis of rotation of the beater. As will be appreciated, the crop is directed generally perpendicular to the feeding members 17a, 17b and 17c which not only direct the crop up the ramps 40, 41 and 42 but also tend to move the crop away from the ends of beater 17.

The shape of the ramps 40, 41, and 42 can be designed as far as possible to follow straight lines from the beater tangent to the corresponding location on the feeding edge. The offset (δ) previously explained determines that these lines will be nearly tangent to the rotor at the feeding edge. Any dead zones created by this simple ramp shape (in which material would otherwise tend to collect) can be filled in. Approximately one third of the width of the beater feeds edge C-C primarily via ramp 42. The outermost extremity of this one third of the beater feeds the upper edge of C-C and the innermost extremity of this one third feeds the lower end of edge C-C. The ramp 42 is a complex shape approximately to a surface generated by a series of straight lines from the tangent of the one third of the beater to their proportionally corresponding locations on feeding edge C-C. Alternatively the lines defining the ramp 42 can be of a slightly concave shape instead of being straight to create a little more volume between the beater and the rotor without dramatically impacting on crop flow. As can be seen from FIG. 4, the ramp 42 is made up from a series of triangular and quadrilateral shaped pieces 42a which approximate to the desired slight concave shape of ramp 42. In production the curve of ramp 42 would be produced as a single piece component on a specially shaped die.

By directing the crop into the inlet end 20a of housing 20 across the helically inclined transition edge sections A-A, B-B and C-C in a direction generally at right angles to these edge sections and drag and compression on the crop is minimised thus increasing the throughput of the crop and reducing the power consumption of the separating mechanism.

Although the invention has been described above in relation to a combine in which a separate threshing cylinder 15 and concave 16 are used ahead of the axial separator 19, the invention can also be used in a combine without such a separate threshing cylinder and concave in which the crop is both threshed and separated between the rotor 21 and the housing 20.

The invention claimed is:
1. A combine comprising:
a cutting mechanism for cutting a crop;
a feed mechanism for feeding the cut crop towards a threshing and/or separating rotor that rotates within a housing about an axis disposed generally longitudinally relative to the combine, the cut crop moving between the rotor and the housing from an inlet end of the housing towards an outlet end of the housing across a grating through which separated grain leaves the housing; and
a final feed section of the feed mechanism wherein the cut crop is fed by the final feed section of the feed mechanism into the inlet end of the housing across a transition edge of the housing that is split into a number of sections, the overall direction of extension of each section of the transition edge being inclined at substantially the same angle with respect to the axis of rotation of the rotor so that the cut crop entering the inlet end of the housing across the transition edge does so generally perpendicular to the transition edge, the transition edge being inclined generally helically relative to the axis of rotation of the rotor; wherein the transition edge sections are offset in a rotation sense around the circumference of the inlet end of the housing in the direction of rotation of the rotor and the transition edge sections are offset axially relative to the housing.

2. The combine according to claim 1, wherein the final feed section of the feed mechanism is divided into a number of ramp sections each configured to feed a respective edge section to direct the crop generally perpendicular to the respective edge section.

3. The combine according to claim 1, wherein the transition edge sections are joined by interconnecting sections which extend generally perpendicular to the edge sections.

4. The combine according to claim 3, wherein the transition edge sections plus the interconnecting sections between them extend around approximately 180° of the inlet end of the housing.

5. The combine according to claim 1, wherein there are three transition edge sections.

6. The combine according to claim 1, wherein prior to entering the final feed section of the feed mechanism the crop passes around a crop beater which rotates about an axis generally transverse to the combine.

7. The combine according to claim 6, wherein the beater is divided asymmetrically along its length into a number of sections corresponding to a number of ramp sections in the final feed section, each section of the beater having differently angled crop feeding members which direct crop towards the number of ramp sections.

8. The combine according to claim 1, wherein there are three ramp sections, a first section of the beater having crop feeding members inclined in a first sense relative to the axis of rotation of the beater, a second section of the beater crop feeding members generally parallel to the axis of rotation of the beater and the third section of the beater having crop feeding members inclined in the opposite sense relative to the axis of rotation of the beater from the crop feeding members of the first beater section.

9. The combine according to claim 1, wherein prior to passing around the crop beater the crop passes between a threshing cylinder and separating concave which are disposed generally transverse to the combine.

10. A combine comprising:
a cutting mechanism for cutting a crop;
a feed mechanism for feeding the cut crop towards a threshing and/or separating rotor that rotates within a housing about an axis disposed generally longitudinally relative to the combine, the cut crop moving between the rotor and the housing from an inlet end of the housing towards an outlet end of the housing across a grating through which separated grain leaves the housing; and
a final feed section of the feed mechanism wherein the cut crop is fed by the final feed section of the feed mechanism into the inlet end of the housing across a transition edge of the housing that is split into a number of sections, the overall direction of extension of each section of the transition edge being inclined at substantially the same angle with respect to the axis of rotation of the rotor so that the cut crop entering the inlet end of the housing across the transition edge does so generally perpendicular to the transition edge, the transition edge being inclined generally helically relative to the axis of rotation of the rotor, wherein prior to entering the final feed section of the feed mechanism the crop passes around a crop beater which rotates about an axis generally transverse to the combine and wherein the crop beater is divided asymmetrically along its length into a number of sections corresponding to a number of ramp sections in the final feed section, each section of the beater having differently angled crop feeding members which direct crop towards one of the number of ramp sections.

11. A combine comprising:
a cutting mechanism for cutting a crop;
a feed mechanism for feeding the cut crop towards a threshing and/or separating rotor that rotates within a housing about an axis disposed generally longitudinally relative to the combine, the cut crop moving between the rotor and the housing from an inlet end of the housing towards an outlet end of the housing across a grating through which separated grain leaves the housing; and
a final feed section of the feed mechanism wherein the cut crop is fed by the final feed section of the feed mechanism into the inlet end of the housing across a transition edge of the housing that is split into a number of sections, the overall direction of extension of each section of the transition edge being inclined at substantially the same angle with respect to the axis of rotation of the rotor so that the cut crop entering the inlet end of the housing across the transition edge does so generally perpendicular to the transition edge, the transition edge being inclined generally helically relative to the axis of rotation of the rotor, wherein prior to entering the final feed section of the feed mechanism the crop passes around a crop beater which rotates about an axis generally transverse to the combine, wherein the crop beater is divided asymmetrically along its length into a number of sections corresponding to a number of ramp sections in the final feed section, each section of the beater having differently angled crop feeding members which direct crop towards one of the number of ramp sections and wherein there are three ramp sections, a first section of the beater having crop feeding members inclined in a first sense relative to the axis of rotation of the beater, a second section of the beater crop feeding members generally parallel to the axis of rotation of the beater and the third section of the beater having crop feeding members inclined in the opposite sense relative to the axis of rotation of the beater from the crop feeding members of the first beater section.

* * * * *